United States Patent [19]

Henderson et al.

[11] 3,919,338

[45] Nov. 11, 1975

[54] IMPROVED PROCESS FOR THE LIQUID PHASE CHLORINATION OF $C_8$–$C_{16}$ PARAFFIN HYDROCARBONS

[75] Inventors: Albert J. Henderson; John E. Krol, both of Coraopolis, Pa.

[73] Assignee: Neville Chemical Company, Pittsburgh, Pa.

[22] Filed: Mar. 12, 1974

[21] Appl. No.: 450,342

Related U.S. Application Data

[63] Continuation of Ser. No. 267,444, June 29, 1972, abandoned.

[52] U.S. Cl. ............................................. 260/660
[51] Int. Cl. ........................................... C07c 17/10
[58] Field of Search ................ 260/660; 204/163 R

[56] References Cited
UNITED STATES PATENTS

| | | | |
|---|---|---|---|
| 1,129,165 | 2/1915 | Buchner | 204/163 R |
| 1,248,065 | 11/1917 | Blanc | 260/660 |
| 3,259,561 | 7/1966 | Sievers | 260/660 |
| 3,567,610 | 3/1971 | Krol et al. | 260/660 |

Primary Examiner—Delbert E. Gantz
Assistant Examiner—Joseph A. Boska
Attorney, Agent, or Firm—Burns, Doane, Swecker & Mathis

[57] ABSTRACT

An improved process for the liquid phase chlorination of a $C_8$ to $C_{16}$ paraffin hydrocarbon mixture is provided which is capable of yielding a product of enhanced quality through the elimination of an undesirable side reaction in the gaseous mixture which is in contact with the liquid mass where the desired chlorination reaction is carried out. A minor quantity of an additive (e.g. carbon tetrachloride) is provided in the reaction zone and is at least partially present in the gaseous mixture where an undesirable reaction between paraffin hydrocarbon vapor and gaseous chlorine is eliminated. Not only is the product color improved, but the liquid phase chlorination reaction has been found to proceed at a more rapid rate.

13 Claims, No Drawings

IMPROVED PROCESS FOR THE LIQUID PHASE CHLORINATION OF $C_8$-$C_{16}$ PARAFFIN HYDROCARBONS

This is a continuation of application Ser. No. 267,444, filed June 29, 1972, now abandoned.

BACKGROUND OF THE INVENTION

The chlorination of normally liquid paraffin hydrocarbon mixtures, e.g. mixtures of those paraffin hydrocarbons containing eight to 16 carbon atoms per molecule, has long been known. Such chlorination has been conducted by introducing chlorine into a reaction zone containing the liquid paraffin hydrocarbon mixture until the desired degree of chlorination has been achieved. Generally, it has not been the practice to dissolve a normally liquid hydrocarbon mixture in a solvent for the same prior to such chlorination as commonly is practiced when a higher molecular weight paraffin hydrocarbon mixture which is normally a solid at room temperature is chlorinated, e.g. a mixture of hydrocarbons containing an average of 20 to 26 carbon atoms per molecule.

Chlorinated paraffin hydrocarbons containing an average of eight to 16 carbon atoms per molecule find utility in a variety of industrial applications. Those chlorinated paraffin hydrocarbons containing about 40 to 73 per cent chlorine by weight may serve as plasticizers for paints, plastics, and rubber compounds, fire retardant coatings, etc. Those chlorinated paraffin hydrocarbons which are chlorinated to a lesser degree are useful as intermediates in the production of detergents.

In recent years increasing effort has been directed to attempting to improve the quality of the chlorinated paraffin hydrocarbon product. For instance, color often is of prime importance in many end use applications, e.g. in the formulation of light colored paints, etc.

Heretofore it commonly has been observed that liquid chlorinated hydrocarbons containing an average of eight to 16 carbon atoms per molecule often include coloration and exhibit less than a water white color, i.e., the product may be yellow or brown in appearance. Also, it has been observed that spontaneous exothermic reactions sometimes occur in the chlorination reaction zone above the liquid mass undergoing chlorination which are accompanied by a flash of light, e.g. a blue flame. Dark particles sometimes have been observed in the liquid chlorinated hydrocarbon product.

It is an object of the invention to provide an improved process for the liquid phase chlorination of a paraffin hydrocarbon mixture containing on the average eight to 16 carbon atoms per molecule.

It is an object of the invention to provide an improved process for the liquid phase chlorination of a paraffin hydrocarbon mixture containing on the average eight to 16 carbon atoms per molecule which yields a product of improved quality.

It is an object of the invention to provide an improved process for the liquid phase chlorination of a paraffin hydrocarbon mixture containing on the average eight to 16 carbon atoms per molecule which yields a product of improved color.

It is an object of the invention to provide an improved process for the liquid phase chlorination of a paraffin hydrocarbon mixture containing on the average eight to 16 carbon atoms per molecule which is economical in operation.

It is another object of the invention to provide an improved process for the liquid phase chlorination of a paraffin hydrocarbon mixture containing on the average eight to 16 carbon atoms per molecule which eliminates a deleterious side reaction in the gaseous mixture which is in contact with the liquid mass where the desired chlorination reaction is carried out.

It is a further object of the invention to provide an improved process for the liquid phase chlorination of a paraffin hydrocarbon mixture containing on the average eight to 16 carbon atoms per molecule which proceeds at an accelerated rate in a readily controllable manner.

These and other objects and advantages of the improved process, as well as its scope, nature, and utilization will be apparent to those skilled in the art from the following description and appended claims.

SUMMARY OF THE INVENTION

It has been found that in a process for the production of chlorinated paraffin hydrocarbons comprising chlorinating a paraffin hydrocarbon mixture containing on the average eight to 16 carbon atoms per molecule while in the liquid state and present in a reaction zone wherein a gaseous mixture comprising a minor proportion of paraffin hydrocarbon vapor and gaseous chlorine exists in contact with said liquid hydrocarbon during at least a portion of the chlorination reaction improved results are achieved by providing in the reaction zone about 2 to 20 per cent by weight based upon the weight of the paraffin hydrocarbon mixture of an additive selected from the group consisting of carbon tetrachloride, chloroform, ethylene dichloride, 1,1,1-trichloroethane, 1,1,2-trichloroethane, and perchloroethane, with the additive being at least partially volatilized and present in the gaseous mixture in contact with the liquid hydrocarbon where it serves to eliminate an undesirable reaction between the paraffin hydrocarbon vapor and the gaseous chlorine thereby improving the quality of the resulting chlorinated paraffin hydrocarbon product.

In a particularly preferred embodiment of the process the additive is carbon tetrachloride which is provided in the reaction zone in a concentration of about 5 to 10 per cent by weight based upon the weight of the paraffin hydrocarbon mixture.

DESCRIPTION OF PREFERRED EMBODIMENTS

The paraffin hydrocarbon mixture which is chlorinated in accordance with the present process may be natural or synthetic in origin and is liquid at room temperature (i.e., at 25°C.). The paraffin hydrocarbon mixture contains on the average eight to 16 carbon atoms per molecule and consists mainly of saturated straight chain hydrocarbons. In a particularly preferred embodiment of the process the paraffin hydrocarbon mixture contains on the average 10 to 13 carbon atoms per molecule. One may optionally include within the liquid hydrocarbon mixture a minor quantity of dissolved higher molecular weight paraffin hydrocarbons (e.g. those containing 20 to 26 carbon atoms per molecule) provided the resulting hydrocarbon mixture still contains on the average not in excess of 16 carbon atoms per molecule and is a homogeneous liquid at room temperature. It is preferred that the paraffin hydrocarbon mixture which serves as the feed contain at least about 90 per cent normal paraffin hydrocarbons by weight, and in a particularly preferred embodiment of the process at least about 95 per cent normal paraffin hydrocarbons by weight. The higher the normal paraffin content the lighter the color and the higher the stability of the chlorinated paraffin product which is achievable. If desired, conventional molecular sieve techniques may be employed to obtain a feed of enhanced normal paraffin hydrocarbon content. The per cent unsaturated compounds in the liquid paraffin hydrocarbon feed should be low, and preferably not exceeding about 0.5 per cent by weight.

An illustrative example of a preferred liquid paraffin hydrocarbon feed for use in the process of the present invention is summarized in the Table below:

Table

| | |
|---|---|
| Per cent normal paraffins by weight | 98% minimum |
| $C_{10}$ paraffins by weight | 9.96% |
| $C_{11}$ paraffins by weight | 48.43% |
| $C_{12}$ paraffins by weight | 36.45% |
| $C_{13}$ paraffins by weight | 4.75% |
| $C_{14}$ paraffins by weight | 0.41% |
| Average carbon atoms per molecule | 11.37 |
| Aromatics by weight | 0.5% maximum |
| Boiling range | 195–240°C. |
| Specific gravity at 25/25°C. | 0.75 |
| Bromine number, less than | 1 |
| Refractive index $N_D^{25}$ | 1.42 |
| Saybolt color | +30 |

The improved process of the present invention is carried out by providing in the reaction zone about 2 to 20 per cent by weight based upon the weight of the paraffin hydrocarbon mixture of an additive selected from the group consisting of carbon tetrachloride, chloroform, ethylene dichloride, 1,1,1-trichloroethane, 1,1,2-trichloroethane, and perchloroethane during the chlorination reaction. The additive is preferably provided in a concentration of about 5 to 10 per cent by weight based upon the weight of the paraffin hydrocarbon mixture. The particularly preferred additive for use in the process is carbon tetrachloride. The additive is preferably introduced into the reaction zone prior to the commencement of the chlorination reaction where it is dissolved in the paraffin hydrocarbon mixture.

The chlorination reaction is carried out with the paraffin hydrocarbon mixture in the liquid state and preferably at a temperature of about 80° to 120°C., and most preferably at a temperature of about 95° to 110°C. Chlorine is reacted with the hydrocarbon by way of a conventional substitution reaction and hydrogen chloride is formed as a by-product. The chlorination is preferably carried out at substantially atmospheric pressure; however, slightly elevated pressures may be utilized. Chlorine preferably continuously is introduced into the liquid hydrocarbon mixture as a gas. The rate of chlorine introduction is preferably adjusted so as to approximate the rate of reaction attainable, and can be decreased should the rate of reaction become excessive. A slight excess of chlorine, e.g. 5 to 15 per cent excess by weight, is usually introduced. The liquid paraffin hydrocarbon undergoing chlorination is preferably stirred or otherwise agitated throughout the reaction.

A gaseous mixture comprising a minor portion of paraffin hydrocarbon vapor, gaseous chlorine, and the additive exists in contact with the liquid hydrocarbon during at least the initial portion of the chlorination reaction. As discussed hereafter, the role of the minor quantity of additive in the reaction zone is believed to be primarily other than that of a typical solvent role.

No solvent is present in the reaction zone in the conventional sense. The product capacity of the reaction zone is accordingly increased and product recovery techniques are simplified.

While it is possible to catalyze the chlorination reaction with a conventional actinic light source, entirely satisfactory reactions are carried out in the absence of light.

If desired, an additive capable of overcoming trace amounts of iron contamination optionally may be provided in the reaction zone in accordance with the teachings of our commonly assigned U.S. Pat. No. 3,567,610 which is herein incorporated by reference.

The improved process of the present invention is capable of producing chlorinated paraffin hydrocarbon products having varying degrees of chlorination. The chlorination reaction may be terminated, e.g. by ceasing chlorine introduction when the desired degree of chlorination has taken place. The progress of the chlorination reaction may be simply monitored, e.g. by the periodic withdrawal of a sample followed by a specific gravity determination. The process may be utilized in the formation of a chlorinated paraffin hydrocarbon product containing about 10 to 75 per cent chlorine by weight. In a preferred embodiment of the process a chlorinated paraffin hydrocarbon is formed having about 40 to 73 per cent chlorine by weight, e.g. about 50 to 70 per cent chlorine by weight.

In a particularly preferred embodiment of the process for the production of chlorinated paraffin hydrocarbons having about 40 to 73 per cent chlorine by weight comprising chlorinating a paraffin hydrocarbon mixture containing on the average 10 to 13 carbon atoms per molecule while present in the liquid state at a temperature of about 95° to 110°C. and present in a reaction zone wherein a gaseous mixture comprising a minor proportion of paraffin hydrocarbon vapor and gaseous chlorine exists in contact with said liquid hydrocarbon during at least a portion of the chlorination reaction improved results are achieved by providing in the reaction zone about 5 to 10 per cent by weight based upon the weight of the paraffin hydrocarbon mixture of carbon tetrachloride, with the carbon tetrachloride being at least partially volatilized and present in the gaseous mixture in contact with the liquid hydrocarbon where it serves to eliminate an undesirable reaction between the paraffin hydrocarbon vapor and the gaseous chlorine thereby improving the quality of the resulting chlorinated paraffin hydrocarbon product. The following chlorination periods are generally encountered when practicing the above embodiment of the process in the absence of light catalysis to reach the desired degree of chlorination:

| Weight Per Cent Chlorine in Chlorinated Paraffin Hydrocarbon | Time in Hours |
|---|---|
| 40 | 10 to 12 |
| 50 | 14 to 16 |
| 60 | 20 to 26 |
| 70 | 34 to 40 |

Conventional apparatus commonly utilized in the chlorination of paraffin hydrocarbons may be selected for use in the process which are provided with means for continuous or intermittent introduction of chlorine into the liquid paraffin hydrocarbon. Such reaction zones are preferably glass lined. Means are preferably also provided for the refluxing of the additive during the chlorination reaction. For instance, a condenser may be provided in conjunction with the reaction zone where vaporized additive is condensed to a liquid and allowed to flow back to the reaction zone. A jacket may also be provided about the reaction zone which may be utilized to bring the liquid paraffin hydrocarbon mixture to the desired chlorination temperature and to aid in the maintenance of a relatively constant temperature within the reaction zone after the chlorination reaction has begun.

At the completion of the chlorination standard techniques may be employed to recover the chlorinated paraffin of a relatively high degree of purity. For instance, air or other gas be blown through the chlorinated product mixture to remove unreacted chlorine, remaining additive, and remaining hydrocarbon chloride by-product resulting from the replacement reaction. Also vacuum distillation techniques may be utilized to improve the purity of the product. Conventional stabilizers next optionally may be added to the chlorinated paraffin hydrocarbon product.

The theory whereby the liquid phase chlorination of a paraffin hydrocarbon mixture containing on the average eight to 16 carbon atoms per molecule in the presence of a small amount of the additives recited serves to produce substantially improved results is considered complex and incapable of simple explanation. The advantages made possible through the inclusion of the minor concentration of the additive may be traced at least in part to the elimination of an undesirable side reaction in the gaseous mixture which is in contact with the liquid mass where the desired chlorination reaction is carried out. The presence of volatilized additive (e.g. carbon tetrachloride) in the gaseous mixture serves to eliminate a degradative exothermic reaction in the gaseous phase between evolved paraffin hydrocarbon vapors and gaseous chlorine. Such a reaction is particularly prone to occur during the initial stages of the chlorination reaction when there exists a high ratio of gaseous chlorine to non-chlorinated hydrocarbon vapor adjacent the liquid mass. The additives utilized in the present process accordingly serve to prevent a product quality impairing degradative reaction within the reaction zone. Flash flames, carbonization, and chlorinolysis reactions are accordingly eliminated, as are the dark product quality impairing by-products of such degradative reactions. Dark particles and dark sludge are absent in the chlorinated paraffin hydrocarbon product.

Also, in the process of the present reaction the chlorination reaction proceeds at an accelerated rate in the presence of the additive and the total reaction time to reach the desired degree of chlorination is shortened. A given reaction zone is accordingly capable of producing a substantially larger product output when practicing the claimed process. Space within the reaction zone is efficiently utilized, and chlorinated product recovery is simple. Since the refluxing of the additive serves to remove heat from the reaction zone, a higher chlorine feed rate is made possible while maintaining ample process control.

The following examples are given as specific illustrations of the invention. It should be understood, however, that the invention is not limited to the specific details set forth in the examples.

EXAMPLE I

The Invention

A liquid paraffin hydrocarbon feed containing on the average 11.37 carbons atoms per molecule as described in the preceding Table was selected as the hydrocarbon reactant. About 8,800 parts by weight of the liquid paraffin hydrocarbon feed were charged to a conventional glass lined reaction vessel. About 1,300 parts by weight of carbon tetrachloride additive were charged to the reaction vessel. Steam was circulated through a jacket surrounding the sides of the reaction vessel and its contents were heated to 85°C. A stirrer was provided within the reaction vessel and its contents continuously were agitated. Situated above the reaction vessel was a condenser where volatilized carbon tetrachloride was condensed and caused to flow back to the reaction vessel. Gaseous chlorine continuously was introduced at the bottom of the reaction vessel whereupon the contents of the reaction vessel were elevated to 105° to 110°C. and the chlorination reaction began. A heat exchange medium next was circulated in the jacket of the reaction vessel to maintain the contents of the reaction vessel at 105° to 110°C. throughout the chlorination reaction. The chlorination reaction was carried out in the absence of light catalysis. Chlorine gas is introduced at rate of about 5 to 15 per cent in excess of that undergoing reaction. The chlorine gas was initially introduced into the reaction vessel at a rate of about 1,100 parts by weight per hour, and this rate was subsequently decreased to about 800 parts by weight per hour. Over a period of 25½ hours about 25,500 parts by weight of chlorine were introduced into the reaction vessel, and the chlorination reaction subsequently was terminated. The contents of the reaction vessel were provided substantially at atmospheric pressure throughout the process. During the chlorination reaction hydrogen chloride gas passed through the condenser and was collected, as was excess chlorine. The liquid reaction product was cooled and air blown to remove chlorine gas and carbon tetrachloride additive. It was determined that about 21,500 parts by weight of liquid chlorinated paraffin hydrocarbon product were produced.

During the chlorination reaction a gaseous mixture which included gaseous chlorine, volatilized paraffin hydrocarbons, and carbon tetrachloride, was present within the reaction vessel in contact with the liquid mass undergoing reaction. There was no indication that an undesirable degradative reaction took place in this gaseous mixture.

The resulting near water white liquid chlorinated paraffin hydrocarbon product exhibited the following properties:

| | |
|---|---|
| Per cent chlorine by weight | 59.2 |
| Specific gravity at 80/80°C. | 1.311 |
| Gardner color | 1– |

The Prior Art

The advantages afforded by the present invention are illustrated by comparing Example I described above with a substantially similar chlorination run in the absence of carbon tetrachloride. More specifically, about 6,300 parts by weight of the same feed were chlorinated as heretofore described except that no carbon tetrachloride was added. The reaction progressed at a slower rate and a total of about 13,200 parts by weight of chlorine were accordingly introduced over a period of 31¾ hours.

During the first two hours of the chlorination reaction a deleterious degradative reaction took place in the gaseous mixture in contact with the liquid mass undergoing reaction which involved a reaction of gaseous chlorine and volatilized paraffin hydrocarbons. A dark by-product deposit was observable on the walls at the upper portion of the reaction vessel. It was determined that about 12,700 parts by weight of liquid chlorinated paraffin hydrocarbon product were produced which exhibited a blackish color.

The resulting liquid chlorinated paraffin hydrocarbon product exhibited the following properties.

| Per cent chlorine by weight | 54.7 |
| Specific gravity at 80/80°C. | 1.218 |
| Gardner color | 6— |

EXAMPLE II

The Invention

To further illustrate the present invention Example I was repeated with the following exceptions. About 7,500 parts by weight of the liquid paraffin hydrocarbon feed, and about 660 parts by weight of carbon tetrachloride were charged to the reaction vessel. Chlorine was initially introduced at a rate of about 900 to 1,000 parts by weight per hour, and subsequently at a rate of about 600 to 700 parts by weight per hour. A total of about 27,900 parts by weight of chlorine were introduced into the reaction vessel over a period of 37¾ hours. There was no indication that an undesirable degradative reaction took place in the gaseous mixture. It was determined that about 21,500 parts by weight of liquid chlorinated paraffin hydrocarbon product were produced.

The resulting near water white liquid chlorinated hydrocarbon product exhibited the following properties:

| Per cent chlorine by weight | 67.5 |
| Specific gravity at 80/80°C. | 1.464 |
| Gardner color | 1— |

The Prior Art

The advantages afforded by the present invention are further illustrated by comparing Example II described above with a substantially similar chlorination run in the absence of carbon tetrachloride. More specifically, about 6,300 parts by weight of the same feed were chlorinated as heretofore described except that no carbon tetrachloride was added. The reaction progressed at a slower rate and a total of about 27,900 parts by weight of chlorine were accordingly introduced over a period of 52 hours.

During the first two hours of the chlorination reaction a deleterious degradative reaction took place in the gaseous mixture in contact with the liquid mass undergoing reaction which involved a reaction of gaseous chlorine and volatilized paraffin hydrocarbons. A dark by-product deposit was observable on the walls at the upper portion of the reaction vessel. It was determined that about 17,100 parts by weight of liquid chlorinated hydrocarbon product were produced which exhibited a yellowish color.

The resulting liquid chlorinated paraffin hydrocarbon product exhibited the following properties:

| Per cent chlorine weight | 67.8 |
| Specific gravity at 80/80°C. | 1.469 |
| Gardner color | 3 |

It will be noted from the chlorination runs of Example I and Example II that the present invention provides an improved process which is particularly suited for the production of a premium quality liquid chlorinated hydrocarbon product within a shorter reaction period than otherwise possible.

EXAMPLE III

Example I may be repeated while substituting a chloroform additive for the carbon tetrachloride additive to obtain similar results.

EXAMPLE IV

Example I may be repeated while substituting an ethylene dichloride additive for the carbon tetrachloride additive to obtain similar results.

EXAMPLE V

Example I may be repeated while substituting a 1,1,1-trichloroethane additive for the carbon tetrachloride additive to obtain similar results.

EXAMPLE VI

Example I may be repeated while substituting a 1,1,2-trichloroethane additive for the carbon tetrachloride additive to obtain similar results.

EXAMPLE VII

Example I may be repeated while substituting a perchloroethane additive for the carbon tetrachloride additive to obtain similar results.

Although the invention has been described with preferred embodiments, it is to be understood that variations and modifications may be resorted to as will be apparent to those skilled in the art. Such variations and modifications are to be considered within the purview and the scope of the claims appended hereto.

We claim:

1. In a process for the production of chlorinated paraffin hydrocarbons comprising chlorinating at a temperature of about 80° to 120°C. a paraffin hydrocarbon mixture which is a liquid at room temperature containing on the average eight to 16 carbon atoms per molecule and consisting mainly of saturated straight chain hydrocarbons while in the liquid state and present in a reaction zone wherein a gaseous mixture comprising a minor proportion of paraffin hydrocarbon vapor and gaseous chlorine exists in contact with said liquid hydrocarbon during at least a portion of the chlorination reaction; the improvement comprising providing in said reaction zone about 2 to 20 percent by weight based upon the weight of said paraffin hydrocarbon mixture of an additive selected from the group consisting of carbon tetrachloride, chloroform, ethylene dichloride, 1,1,1-trichloroethane, 1,1,2-trichloroethane, and perchloroethane, with said additive being under reflux during said chlorination reaction and at least partially volatilized and present in said gaseous mixture in contact with said liquid hydrocarbon where it serves to eliminate an undesirable reaction between said paraffin hydrocarbon vapor and said gaseous chlorine thereby improving the quality of the resulting chlorinated paraffin hydrocarbon product, and with no solvent for said hydrocarbon mixture being present in said reaction zone other than said minor concentration of said additive which primarily serves a role other than that of a solvent.

2. An improved process for the production of chlorinated paraffin hydrocarbons according to claim 1 wherein said paraffin hydrocarbon mixture contains at least 90 per cent normal paraffins by weight.

3. An improved process for the production of chlorinated paraffin hydrocarbons according to claim 1 wherein said paraffin hydrocarbon mixture contains on the average 10 to 13 carbon atoms per molecule.

4. An improved process for the production of chlorinated paraffin hydrocarbons according to claim 1 wherein said paraffin hydrocarbon mixture during said chlorination is provided at about 95° to 110°C.

5. An improved process for the production of chlorinated paraffin hydrocarbons according to claim 1 wherein said additive is present in said reaction zone in a concentration of about 5 to 10 per cent by weight based upon the weight of said paraffin hydrocarbon mixture.

6. An improved process for the production of chlorinated paraffin hydrocarbons according to claim 1 wherein said additive is carbon tetrachloride.

7. An improved process for the production of chlorinated paraffin hydrocarbons according to claim 1 wherein said additive is dissolved in said paraffin hydrocarbon mixture prior to said chlorination.

8. An improved process for the production of chlorinated paraffin hydrocarbons according to claim 1 wherein said resulting chlorinated paraffin hydrocarbon product contains about 10 to 75 per cent chlorine by weight.

9. An improved process for the production of chlorinated paraffin hydrocarbons according to claim 1 wherein said resulting chlorinated paraffin hydrocarbon product contains about 40 to 73 per cent chlorine by weight.

10. In a process for the production of chlorinated paraffin hydrocarbons having about 40 to 73 percent chlorine by weight comprising chlorinating a paraffin hydrocarbon mixture which is a liquid at room temperature containing on the average 10 to 13 carbon atoms per molecule and consisting mainly of saturated straight chain hydrocarbons while present in the liquid state at a temperature of about 95° to 110°C. and present in a reaction zone wherein a gaseous mixture comprising a minor proportion of paraffin hydrocarbon vapor and gaseous chlorine exists in contact with said liquid hydrocarbon during at least a portion of the chlorination reaction; the improvement comprising providing in said reaction zone about 5 to 10 percent by weight based upon the weight of said paraffin hydrocarbon mixture of carbon tetrachloride, with said carbon tetrachloride being under reflux during said chlorination reaction and at least partially volatilized and present in said gaseous mixture in contact with said liquid hydrocarbon where it serves to eliminate an undesirable reaction between said paraffin hydrocarbon vapor and said gaseous chlorine thereby improving the quality of the resulting chlorinated paraffin hydrocarbon product, and with no solvent for said hydrocarbon mixture being present in said reaction zone other than said minor concentration of said additive which serves primarily a role other than that of a solvent.

11. An improved process for the production of chlorinated paraffin hydrocarbons according to claim 10 wherein said paraffin hydrocarbon mixture contains at least 95 per cent normal paraffins by weight.

12. An improved process for the production of chlorinated paraffin hydrocarbons according to claim 10 wherein said carbon tetrachloride is dissolved in said paraffin hydrocarbon mixture prior to said chlorination.

13. An improved process for the production of chlorinated paraffin hydrocarbons according to claim 10 wherein gaseous chlorine is continuously introduced into said paraffin hydrocarbon mixture during said chlorination.

* * * * *